United States Patent Office 3,158,620
Patented Nov. 24, 1964

3,158,620
PYRAZOLE COMPOUNDS AND PROCESS THEREFOR
Erwin Klingsberg, Mountainside, N.J., assignor to American Cyanamid Company, Stamford, Conn., a corporation of Maine
No Drawing. Filed June 12, 1962, Ser. No. 201,769
4 Claims. (Cl. 260—310)

This invention relates to a new proces for the preparation of pyrazoles and pyrazolium salts. More specifically, it relates to a new process of forming pyrazoles and pyrazolium salts which comprises the reaction of 1,2-dithiolium salts and hydrazines. It also relates to new cationic dyes useful for coloring acrylic fibers. More specifically, it relates to aryl pyrazolium dyestuffs.

It has been found that pyrazoles may be prepared by a new reaction. In copending application, Serial No. 27,254, filed May 6, 1960, now abandoned is described the preparation of 1,2-dithiolium salts. These salts (characterized by a cation having a five membered ring of three carbons and two adjacent sulfurs, and a resonating charge) form the starting materials for this invention.

Any monocyclic 1,2-dithiolium salt may be converted to the corresponding pyrazole derivative by this process, and thus, in its broad aspect this invention is not limited to any particular 1,2-dithiolium starting material. However, certain 1,2-dithiolium salts by reason of their availability and the usefulness of the end-product, particularly lend themselves to conversion by the present invention. They may be represented by the following Formula I:

(I) 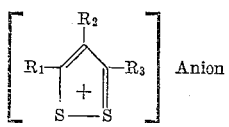 Anion wherein each of the $R_1$, $R_2$ and $R_3$ radicals is either hydrogen, alkyl (especially lower alkyl, e.g., methyl, ethyl, propyl, butyl, hexyl and cyclohexyl), monocyclic lower aralkyl (e.g., benzyl and phenethyl), aryl of less than three 6-membered rings (e.g., phenyl, biphenyl and naphthyl), lower haloalkyl (e.g., trichloromethyl and trifluoromethyl), lower cyanoalkyl (e.g., cyanoethyl), lower hydroxyalkyl (e.g., hydroxyethyl), or lower alkoxyalkyl (e.g., ethoxymethyl). "Anion" is the anion of any acid, preferably one having a pKa less than about 4. Aryl radicals appearing in the foregoing may contain up to three chloro, bromo, fluoro, nitro, lower alkyl, hydroxy, lower alkoxy, primary amino, secondary amino or tertiary amino substituents. In the secondary and tertiary amino groups, substituents may be lower alkyl, monocyclic aryl, lower cyanoalkyl, lower hydroxyalkyl and/or monocyclic lower aralkyl.

In the process upon which the invention is based, 1,2-dithiolium salts are reacted in equimolar proportions with a hydrazine to replace the ring sulfurs with nitrogens and form a pyrazole derivative. When hydrazine itself is used, the nitrogens of the pyrazole are unsubstituted. A mono-substituted hydrazine gives the N-mono-substituted pyrazole. An N,N'-disubstituted hydrazine gives the N,N'-disubstituted pyrazolium salt.

In this process, the hydrazine may be used as the reaction solvent if it is liquid at ambient temperature, or molten. The reaction may also be run in an organic solvent, including such neutral solvents as alcohol and such weakly basic solvents as pyridine, triethylamine, and dimethylformamide. The 1,2-dithiolium salt is stirred into a molar quantity (or an excess) of the hydrazine. After completion of the reaction, dilution with water gives the product. Pyrazones and 1-monosubstituted pyrazoles are conveniently isolated as the free base, while 1,2-disubstituted pyrazolium products are isolated as salts, the anion of which may have originated from the dithiolium starting material or by the addition of acid. The anion of the acid may be the same as, or different from, the one in the dithiolium salt originally used.

Hydrazines which may be used comprise any hydrazine having at least one hydrogen atom on each nitrogen. Those hydrazines which are solid may be melted and the reaction run in the melt. Examples of usable hydrazines include hydrazine itself (usually in the form of hydrazine hydrate), alkylhydrazines (such as methylhydrazine, β-hydroxyethylhydrazine, ethylhydrazine, isopropylhydrazine, butylhydrazine, octylhydrazine, 1,2-dimethylhydrazine), aralkylhydrazines (such as dibenzylhydrazine and benzylhydrazine), arylhydrazines such as phenylhydrazine, o-, m- and p-nitrophenylhydrazine, o-, m- and p-chlorphenylhydrazine, o-, m- and p-tolylhydrazine, 2,4-dibromophenylhydrazine, 2-bromo-4-methylphenylhydrazine, α- and β-naphthylhydrazines, 1-phenyl-2-benzylhydrazine, hydrazobenzene, and the like. In general, any hydrazine which has at least one hydrogen on each nitrogen can be used in this reaction. Many such compounds can be found in Audrieth's "The Chemistry of Hydrazine", Wiley, New York, 1951, and in Beilstein's "Handbuch der organischen Chemie," volumes 4 and 15 of the principal work and all later supplements, and these volumes are herein expressly incorporated by reference for such disclosure.

The reaction of this invention has given rise to a class of compounds never before prepared. Thus, when the hydrazine reagent is N,N'-diaryl substituted, the resulting pyrazolium compounds have aryl substituents on the 1- and 2-positions of the heterocycle. Such compounds are not, as far as known, obtainable by prior art methods for forming pyrazolium compounds. These may be represented by the Formula II:

(II) 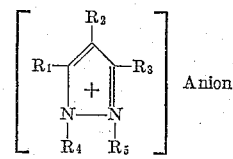 Anion wherein $R_1$, $R_2$ and Anion are as defined above; the $R_6$ and $R_4$ and/or $R_5$ are individually aromatic radicals of less than three rings which may bear up to three halo, lower alkyl, carboxy, lower alkoxy and/or nitro groups, or the like.

The N,N'-diarylpyrazolium salts of Formula II are useful chemical compounds. Thus, they may be used as intermediates in the synthesis of chemical compounds such as azo dyestuffs for acrylic fibers, e.g., polyacrylonitriles. Azo dyes of this type are formed by the nitration of the aryl ring, followed by reduction of the nitro group to an amino group. Upon diazotization and coupling in the customary manner, azo dyes are obtained. The quaternized derivatives are cationic dyestuffs for the dyeing of acrylic fibers.

The process of this invention may be used to prepare another class of dyestuffs useful for coloring acrylic fibers. These dyes can be termed aminoarylpyrazolium salts and are represented by the following Formula III:

(III) 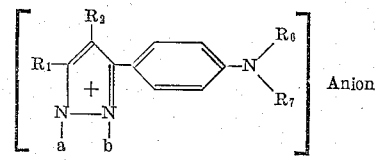 Anion wherein $R_1$, $R_2$ and Anion are as defined above; the $R_6$ and $R_7$ symbols are individually hydrogen, lower alkyl, monocyclic aryl, lower cyanoalkyl, lower hydroxyalkyl or monocyclic lower aralkyl radicals; and $a$ and $b$ are individually monocyclic aryl, lower alkyl or monocyclic lower aralkyl radicals, the aryl radicals of which may be substituted as hereinbefore described.

They are prepared by one of several alternative procedures. In one method a 3-aryl-1,2-dithiolium compound is nitrated in the para position of the aryl group and then treated with a mono-substituted hydrazine as described above. The resulting pyrazole can be then quaternized by conventional methods to give the corresponding pyrazolium derivative. The latter can be treated with a reducing agent capable of converting the nitro group to an amino group, and then alkylated to give the desired dyestuff. By another method, a p-(tert.-aminoaryl)-1,2-dithiolium salt may be treated with a mono-substituted hydrazine to give a pyrazole salt, which salt may be then ring quaternized to give the desired pyrazolium dyestuff. By still another method, the preferred one, the p-(tert.-aminoaryl)-1,2-dithiolium salt may be treated with an N,N'-disubstituted hydrazine to yield the desired pyrazolium dyestuff directly. The choice of which method is best employed can be made on the basis of availability, reactivity and cost of starting materials, as well as the physical state of the hydrazine reagent (whether liquid or solid) necessitated thereby.

The present invention is illustrated by the following examples in which, unless otherwise specified, parts are by weight and temperature is centigrade.

*Example 1*

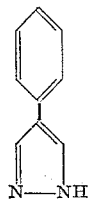

A mixture of 1.5 parts of 4-phenyl-1,2-dithiolium hydrogen sulfate and 15 parts by volume of 85% hydrazine hydrate is stirred thoroughly until the reaction is complete. The mixture is then diluted with water and filtered. The product may be crystallized from ethanol or xylene.

Other 4-phenyl-1,2-dithiolium salts react similarly, such as the bromide, the thiocyanate, and the diiodide.

*Example 2*

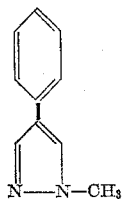

One part of 4-phenyl-1,2-dithiolium hydrogen sulfate is dissolved in about five parts of methylhydrazine. After a short time, the product is isolated by dilution with water and filtration, and then crystallized from methylcyclohexane.

*Example 3*

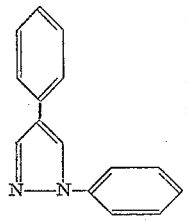

A mixture of one part of 4-phenyl-1,2-dithiolium hydrogen sulfate and four parts of phenyl-hydrazine is ground until the reaction is complete. The mixture is diluted with dilute hydrochloric acid. The product may be crystallized from hexane.

*Example 4*

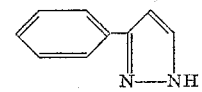

One part 3-phenyl-1,2-dithiolium hydrogen sulfate, four parts of 85% hydrazine hydrate and forty parts by volume of ethanol are stirred together until the reaction is complete and then evaporated. The product is dissolved in ether, washed with water, dried and evaporated. It is then crystallized from hexane.

*Example 5*

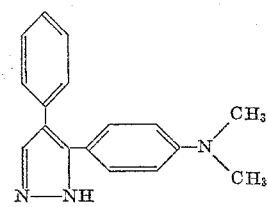

A mixture of three parts of finely divided 3-(p-dimethylaminophenyl)-4-phenyl-dithiolium perchlorate and 50 parts of hydrazine hydrate is stirred until reaction is complete, and then filtered. The product is a yellow solid which may be crystallized from methylcyclohexane. On methylation and quaternization, it gives a red cationic dye. This is applied readily to acrylic fibers by boiling 2% of the dye (on the weight of the fiber) in 200 parts of water containing 2% acetic acid and 3% sodium acetate for one hour, followed by rinsing.

*Example 6*

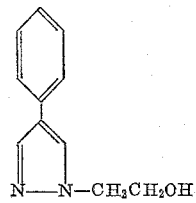

One part of 4-phenyl-1,2-dithiolium bromide is added to 10 parts of 70% beta-hydroxyethylhydrazine. When the evolution of heat subsides, the mixture is heated on the steam bath for ten minutes, turning yellow. Dilution and filtration gives the product, M.P. 100–102°. It may be purified by crystallization from hexane.

*Example 7*

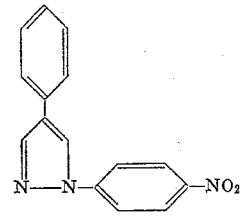

A mixture of 1 part of 4-phenyl-1,2-dithiolium bromide and 0.75 part of p-nitrophenylhydrazine in about 15 parts of pyridine is heated on the steam bath for one hour and at reflux for one hour, and then diluted with hydrochloric acid and filtered. The product may be purified by crystallization from methylcyclohexane; M.P. 193–4°.

Example 8

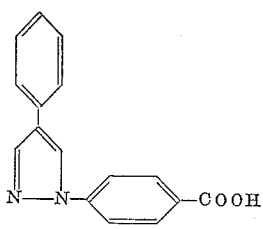

A mixture of 10.0 parts of 4-phenyl-1,2-dithiolium bromide and 7.6 parts of p-hydrazinobenzoic acid in 150 parts of pyridine is heated on the steam bath for one hour and at reflux for one hour. The product is isolated by dilution with hydrochloric acid followed by filtration, and may be crystallized from acetic acid; M.P. 269°.

This example illustrates the use of hydrazines having an acid group, e.g., the carboxyl radical, as a reagent in the process of this invention.

Example 9

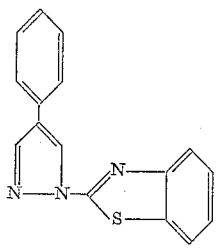

A mixture of 8.25 parts of 2-hydrazinobenzothiazole and 10.0 parts of 4-phenyl-1,2-dithiolium bromide in 150 parts of pyridine is heated on the steam bath for one hour and at reflux for an hour. The product is isolated by dilution with hydrochloric acid followed by filtration. It may be purified by crystalization from methylcyclohexane; M.P. 147–19°.

This example illustrates the use of hydrazines having a heterocyclic moiety. In the process of this invention, other heterocyclics such as 2-hydrazinopyridine and 2-hydrazinoquinoline may also be used.

Example 10

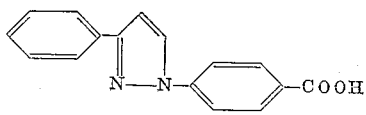

A mixture of 3.06 parts of 3 - phenyl - 1,2 - dithiolium iodide and 3.04 parts of p-hydrazinobenzoic acid in 50 parts of pyridine is heated on the steam bath for one hour and at reflux for one hour. The product is isolated by dilution with hydrochloric acid followed by filtration, and may be purified by crystallization.

Example 11

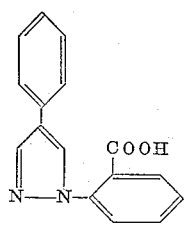

A mixture of 5.2 parts of 4-phenyl-1,2-dithiolium bromide and 5.8 parts of o-hydrazinobenzoic acid hydrochloride in 80 parts of pyridine is heated on the steam bath for one hour and at reflux for one hour. The product is isolated by cooling, dilution with hydrochloric acid, and filtration. It may be purified by crystallization from xylene or butyl acetate; M.P. 217–9°.

Example 12

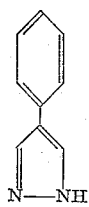

4-phenyl-1,2-dithiolium bromide is added to excess hydrazine hydrate dissolved in triethylamine. After completion of the reaction, the product is isolated by dilution and filtration. It is identical with the 4-phenylpyrazole of Example 1.

Example 13

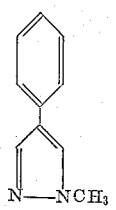

4-phenyl-1,2-dithiolium bromide is added at room temperature to methylhydrazine (in excess) dissolved in dimethylformamide. After completion of the reaction, 1-methyl-4-phenylpyrazole, M.P. 103–4°, is isolated after dilution. It is identical with the product of Example 2.

Example 14

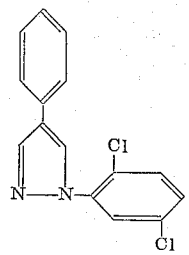

A mixture of 2.6 parts of 4-phenyl-1,2-dithiolium bromide and 2.3 parts of 2,5-dichlorophenylhydrazine in 45 parts of pyridine is heated for one hour on the steam bath and 1½ hours at reflux, cooled, diluted with hydrochloric acid, and filtered. The product is crystallized from hexane, M.P. 93.5–95.5°.

Example 15

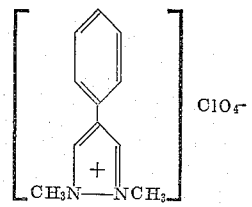

1,2-dimethylhydrazine dihydrochloride (3.2 parts) is stirred at −30 to −40° in about 30 parts of pyridine and about 15 parts of acetone while 5.0 parts of 4-phenyl-1,2-dithiolium bromide is added over a 45 minute period. The mixture, in a lightly stoppered vessel, is stirred at −30° for six and one-half hours and then at room temperature until the reaction is complete. The yellow product is filtered, washed with a little pyridine, dried, dissolved in water, and treated with 70% perchloric acid. The heavy white precipitate is filtered and washed with a little water to give the product, M.P. 177.5–180°. It crystallizes as white needles from ethanol, M.P. 181–183°.

Example 16

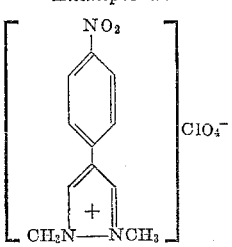

A solution of 0.94 part of 1,2-dimethylhydrazine dihydrochloride in about 5 parts of pyradine and 3 parts of ethanol is stirred at −79° while 1.60 parts of 4-(p-nitrophenyl)-1,2-dithiolium hydrogen sulfate is added during 45 minutes. The resulting yellow suspension is stirred for an additional 3½ hours at −79°, and then at room temperature until the reaction is complete. The solid is filtered, washed with a little pyridine, dissolved in 15–20 parts of water, freed of insoluble matter by filtration, and treated with 0.5 part of 70% perchloric acid. The heavy yellow precipitate is chilled, filtered, and washed with a little cold water and dried; M.P. 168.5–170.5°.

Example 17

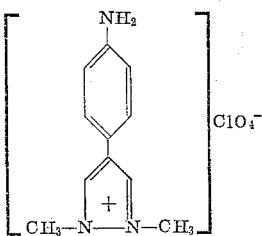

To a stirred suspension of 1.50 parts of 1,2-dimethyl-4-(p-nitrophenyl)pyrazolium perchlorate of Example 16 and 0.15 part of 10% Pd—C catalyst in 8 parts of ethanol is added, during 1½ hours at room temperature, a solution of 1.0 part of 100% hydrazine hydrate in 2.0 parts of ethanol. The flask is stoppered lightly and the suspension stirred overnight. The suspended solids are then filtered, heated to the boil in 35 parts of water, and filtered. The yellow product crystallizes on cooling, M.P. 213–214.5°. Crystallization from dilute ethanol raises the M.P. to about 221.5–222°.

The product of Example 17 may be converted to 1,2-dimethyl - 4 - [p - (p - dimethylaminophenylazo)phenyl]-pyrazolium perchlorate hydroperchlorate by the following procedure:

A mixture of 0.50 part of 1,2-dimethyl-4-(p-aminophenyl)pyrazolium perchlorate, 1.5 parts of conc. HCl, and 15 parts of water is stirred in an ice bath and diazotized in the usual manner by the addition of 0.12 part of sodium nitrite dissolved in 4–5 parts of water. After the addition of 0.21 part of N,N-dimethylaniline, the mixture is buffered with sodium acetate solution and stirred four hours in the ice bath and overnight at room temperature. The addition of 0.5 part of 70% perchloric acid gives the dye as a deep purple precipitate which is filtered, washed with a little cold water, and dried, M.P. 211–215°. Crystallization from nitromethane raises the decomposition temperature to about 217–217.5°.

Example 18

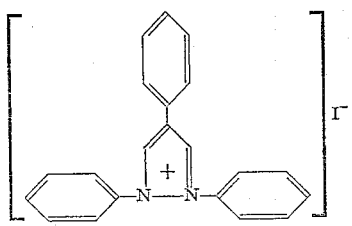

A solution of 9.2 parts of 1,2-diphenylhydrazine in about 100 parts of pyridine and 50 parts of ethanol is stirred at −15° to −20° while 10.0 parts of 4-phenyl-1,2-dithiolium bromide is added during one hour. The very viscous resulting mixture is stirred for an additional 2½ hours at −20°, and then at room temperature until the the reaction is complete. The reaction mixture is treated with dilute hydrochloric acid and filtered. Addition of hydriodic acid to the filtrate gives 1,2,4-triphenylpyrazolium iodide, M.P. 277–282°. Crystallization from ethanol raises the M.P. to 288.5–290°.

The corresponding perchlorate is prepared from the iodide in hot ethanol solution and crystallized from ethanol, M.P. (dec.) 304–305°.

This application is a continuation-in-part of Serial No. 27,280, filed May 6, 1960, now abandoned.

I claim:

1. A process of preparing a pyrazole compound which comprises reacting a 1,2-dithiolium salt of the formula:

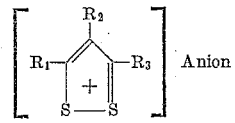

wherein $R_1$, $R_2$ and $R_3$ are individually selected from the group consisting of hydrogen, lower alkyl, monocyclic ar(lower alkyl), phenyl, nitrophenyl, chlorophenyl, lower monohaloalkyl, lower monocyanoalkyl, lower monohydroxyalkyl and lower monoalkoxyalkyl, and Anion is selected from the group consisting of iodide, perchlorate, bromide, hydrogen sulfate and thiocyanate with a molar quantity of a hydrazine having at least one hydrogen atom on each nitrogen and no more than two substituents selected from the group consisting of lower alkyl, lower monohydroxyalkyl, monocyclic ar(lower alkyl), phenyl, nitrophenyl, chlorophenyl, bromophenyl, bromomethylphenyl, carboxyphenyl, naphthyl, benzothiazylyl and di-lower alkylaminophenyl and separating the product thus formed.

2. The process of claim 1 wherein the hydrazine reagent is hydrazine.

3. A compound of the formula:

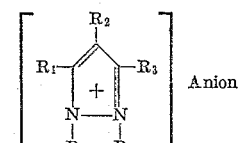

wherein $R_1$, $R_2$ and $R_3$ are individually selected from the group consisting of hydrogen, lower alkyl, benzyl, phenethyl, phenyl, nitrophenyl, chlorophenyl, lower monohaloalkyl, lower monocyanoalkyl, lower monohydroxyalkyl and lower monoalkoxyalkyl, Anion is a member selected from the group consisting of iodide, perchlorate, bromide, hydrogen sulfate and thiocyanate, and $R_4$ and $R_5$ are individually members selected from the group consisting of phenyl, nitrophenyl, carboxyphenyl, chlorophenyl, naphthyl and benzothiazolyl.

4. 1,2,4-triphenyl pyrazolium salt, the anion of which is a member selected from the group consisting of iodide, perchlorate, bromide, hydrogen sulfate and thiocyanate.

References Cited in the file of this patent

Bauer et al.: Berichte, vol. 63, pages 2691–95 (1930).
Jacobs: Pyrazoles and Related Compounds, in Elderfield, Heterocyclic Compounds, vol. 5, pages 93–95, New York, Wiley, 1957.